G. TEFO.
POTATO DIGGER.
APPLICATION FILED JULY 6, 1910.
989,442.
Patented Apr. 11, 1911.
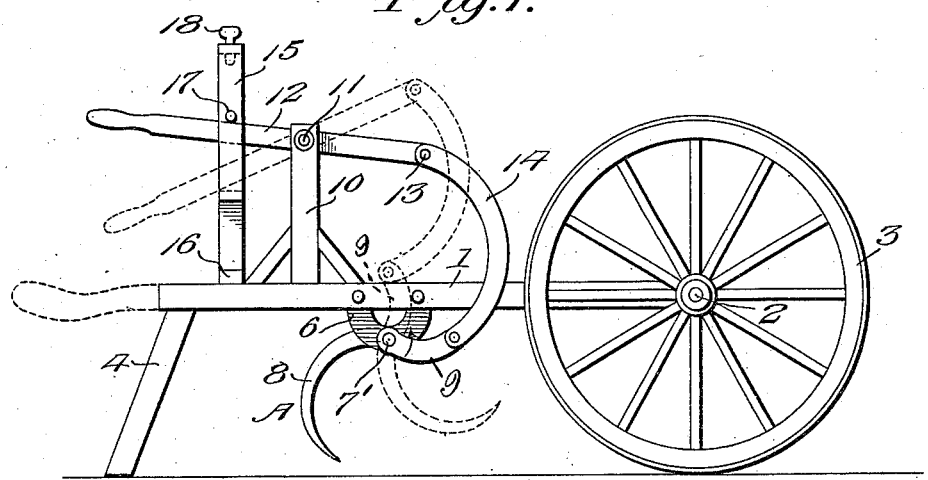
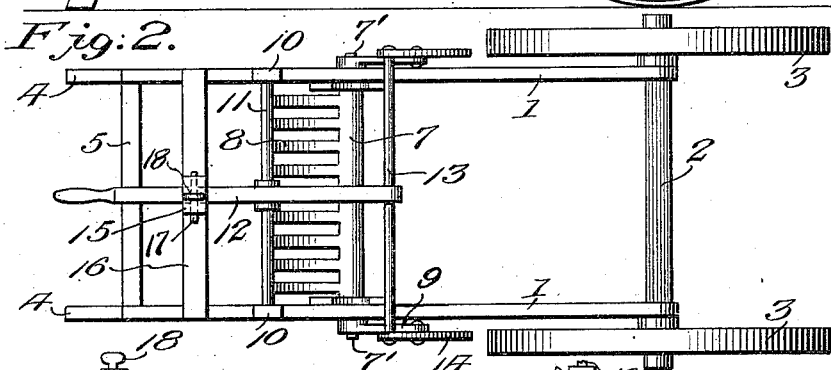
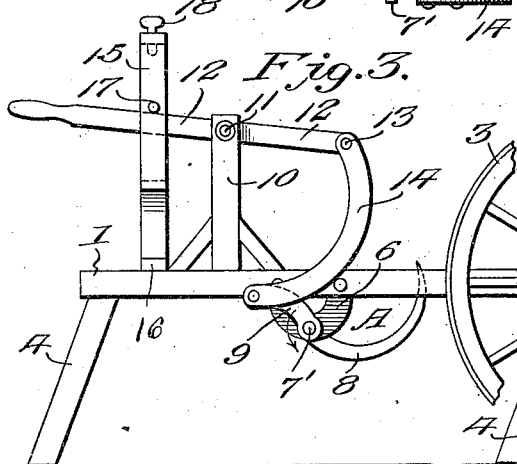
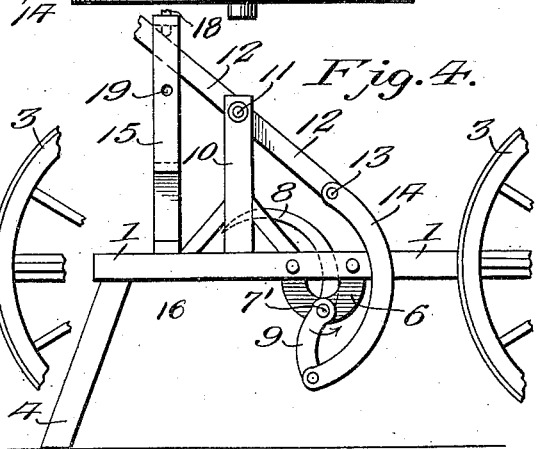
Witnesses
Edwin F. McKee
Wm. Bagger
Inventor
George Tefo
By Victor J. Evans
Attorney

UNITED STATES PATENT OFFICE.

GEORGE TEFO, OF VULCAN, MICHIGAN.

POTATO-DIGGER.

989,442.

Specification of Letters Patent. Patented Apr. 11, 1911.

Application filed July 6, 1910. Serial No. 570,584.

*To all whom it may concern:*

Be it known that I, GEORGE TEFO, a citizen of the United States of America, residing at Vulcan, in the county of Dickinson and State of Michigan, have invented new and useful Improvements in Potato-Diggers, of which the following is a specification.

This invention relates to potato diggers, and it has for its object to produce a simple and inexpensive machine, readily operable by hand power by means of which potatoes may be conveniently and thoroughly dug from the ground, separated from the dirt and deposited in piles to enable them to be conveniently gathered.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a side elevation of a potato digger constructed in accordance with the invention, showing the digging or excavating member in its initial position ready for digging and with dotted lines indicating the digging member partway advanced to the next or carrying position. Fig. 2 is a top plan view. Fig. 3 is a side elevation of a portion of the machine showing the digging member in the carrying position. Fig. 4 is a side elevation of a portion of the machine, showing the digging member in discharging position.

Corresponding parts in the several figures are denoted by like characters of reference.

The frame of the machine includes side members 1, 1 connected with and supported by an axle 2 having ground wheels 3, 3. The side members are provided adjacent to their front ends with supporting members or legs 4, and they are connected together by a cross bar 5. The side members may be extended, as shown in dotted lines in Fig. 1, to form handles which may be grasped by the operator for convenience in moving the machine from place to place. The side members 1 are provided with depending brackets 6 affording bearings for the digging member A which may be described as consisting of a shaft or body portion 7 terminally extended to form pivot members which are supported for rotation in the bearings, as indicated at 7'. The shaft or body portion is provided with radially extending curved or arcuate teeth or tines 8. The terminal ends or pivots of the shaft or body 7 are equipped with curved or arcuate cranks 9 extending in the opposite direction to the tines 8.

Standards 10 rising from the side members 1 afford bearings for a rock shaft 11 carrying a lever 12, the rear end of which carries a cross bar 13 the ends of which are connected with the cranks 9 by means of links 14. The forward end of the lever 12 moves in a guide member 15 which is mounted upon a cross bar 16 connecting the side members of the frame, said guide member being provided with a detachable stop member, such as a pin or plug 17, lying in the path of the lever 12 to limit the stroke or movement of the latter, said plug or stop member being arranged at a suitable distance from the upper extremity of the guide. The latter is provided at its upper extremity with an adjustable stop member, such as a set screw 18 which serves to limit the upward movement of the lever when the plug 17 is removed from the aperture 19 provided for its reception, as will be seen in Fig. 4.

The normal or initial position of the parts of the machine is indicated in full lines in Fig. 1, from which it will appear that the forward end of the lever 12 rests against the underside of the stop member 17, the teeth or tines of the digging member being pointed downwardly and rearwardly. The machine in operation, straddles the row of potatoes that is to be operated upon, and it is obvious that when the legs stand in the furrows adjacent to the ridge, the digging member will enter into the furrow to the requisite depth. The parts are not only proportioned to obtain this result, but the supporting legs may, if desired, be depressed into the loose soil to the requisite depth. By depressing the forward end of the lever to the position indicated in Fig. 1 in dotted lines and again restoring it to its initial position in the manner of a pump handle, the digging member will be swung past the position indicated in dotted lines in Fig. 1, and to the position indicated in full lines in Fig. 3, thus causing the tines to dig into the soil and to gather the potatoes from the hill adjacent to which the digger has been positioned, the potatoes and some loose dirt being gathered in the basket-like receptacle formed by the tines. To assist in performing this operation, the links 14 are preferably curved, as shown, so that an excess of weight will be located at one side of the pivotal members which connect said links respectively with the cross bar 13 of the lever 12 and with the cranks 9 to assist in overcoming the dead center when the lever is manipulated to actuate the digger against the resistance of the earth. If necessary, separation may be effected by a few short downward strokes of the forward end of the lever, causing the dirt to be sifted between the tines. While in this position, the machine may be moved forward adjacent to the next hill. The stop member 17 is now removed, and the forward end or handle of the lever is thrown upward, as indicated in Fig. 4, thus throwing the digging member in an upward and forward direction to the discharging position indicated in Fig. 4. By restoring the lever arm or handle to its initial position, the rotation of the digging member will be completed, and the initial position indicated in Fig. 1 will be resumed, the apparatus being now ready for repetiton of the digging operation. It is obvious that when the potatoes are planted in drills, the moving of the apparatus from place to place will be gaged accordingly.

By means of this machine or apparatus, the construction and operation of which is extremely simple, potatoes may be efficiently dug, separated from the adhering dirt and deposited in piles from which they may be conveniently gathered.

Having thus described the invention, what is claimed as new, is—

1. In a potato digger, a digging member supported for rotation, lever means for rotating the digging member by successive manipulations, and stop means movably disposed in the path of the lever.

2. In a potato digger, a digging member supported for rotation and having teeth extending in one direction and cranks in an opposite direction, an actuating lever, and links connecting the lever with the cranks of the digging member.

3. In a potato digger, a digging member supported for rotation and having a crank, an operating lever, and a link connecting the lever with the crank.

4. In a potato digger, a digging member supported for rotation, means for rotating the digging member by successive movements, and means for supporting the digging member at the end of each movement.

5. In a potato digger, a frame having supporting wheels, a digging member supported for rotation and having cranks, a hand lever, a cross bar carried by the lever, links connecting the cross bar with the cranks, a guide for the lever, and stop means movably connected with the guide and lying in the path of the lever, said lever being adapted by successive manipulations to effect a complete rotation of the digging member, said stop means being adapted to support the lever and the digging member in adjusted position at the end of each manipulation.

In testimony whereof I affix my signature in presence of two witnesses.

GEORGE TEFO.

Witnesses:
ANTON BUTTLER,
CLINTON W. TURNER.

---

Copies of this patent may be obtained for five cents each, by addressing the "Commissioner of Patents, Washington, D. C."